Patented Nov. 18, 1941

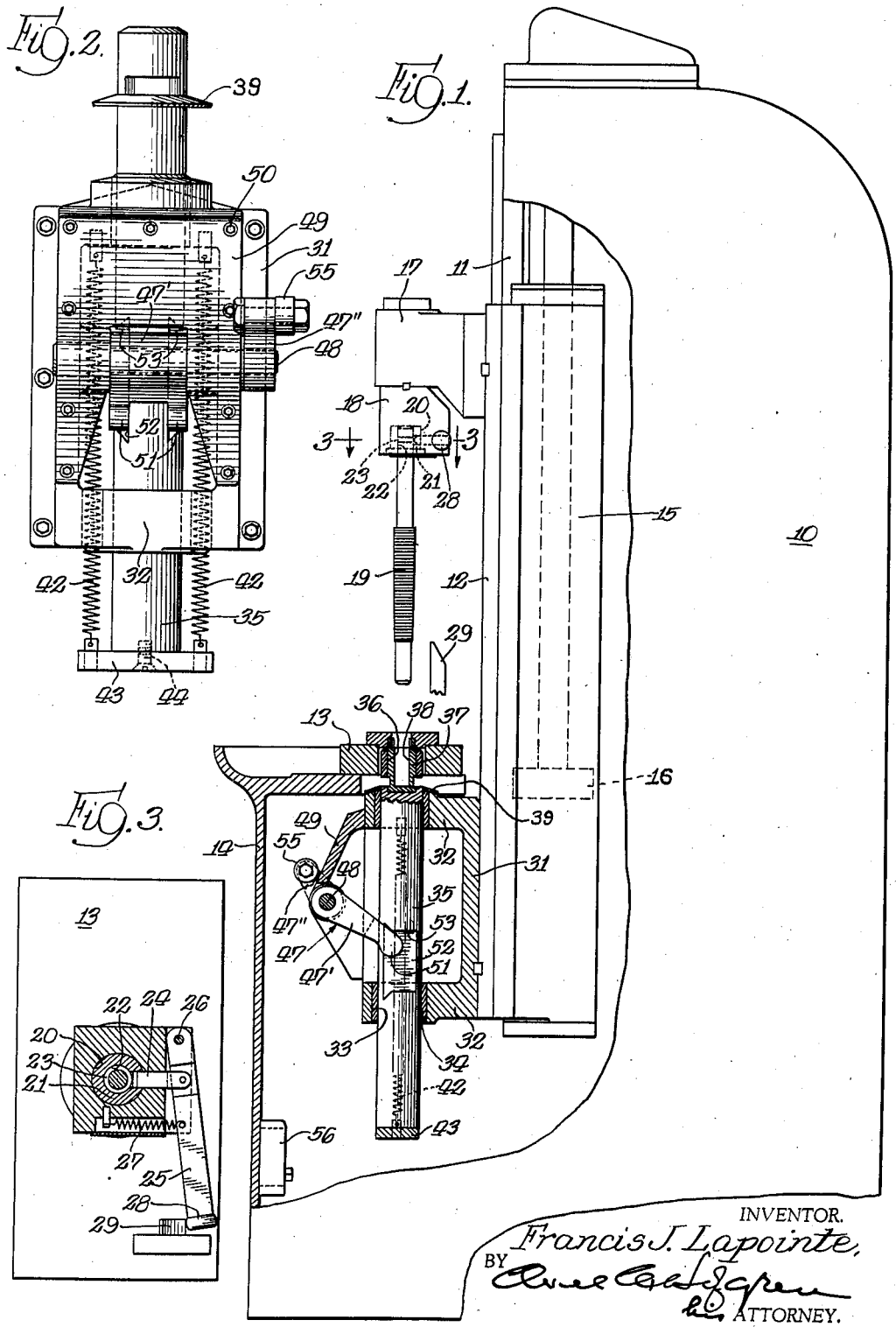

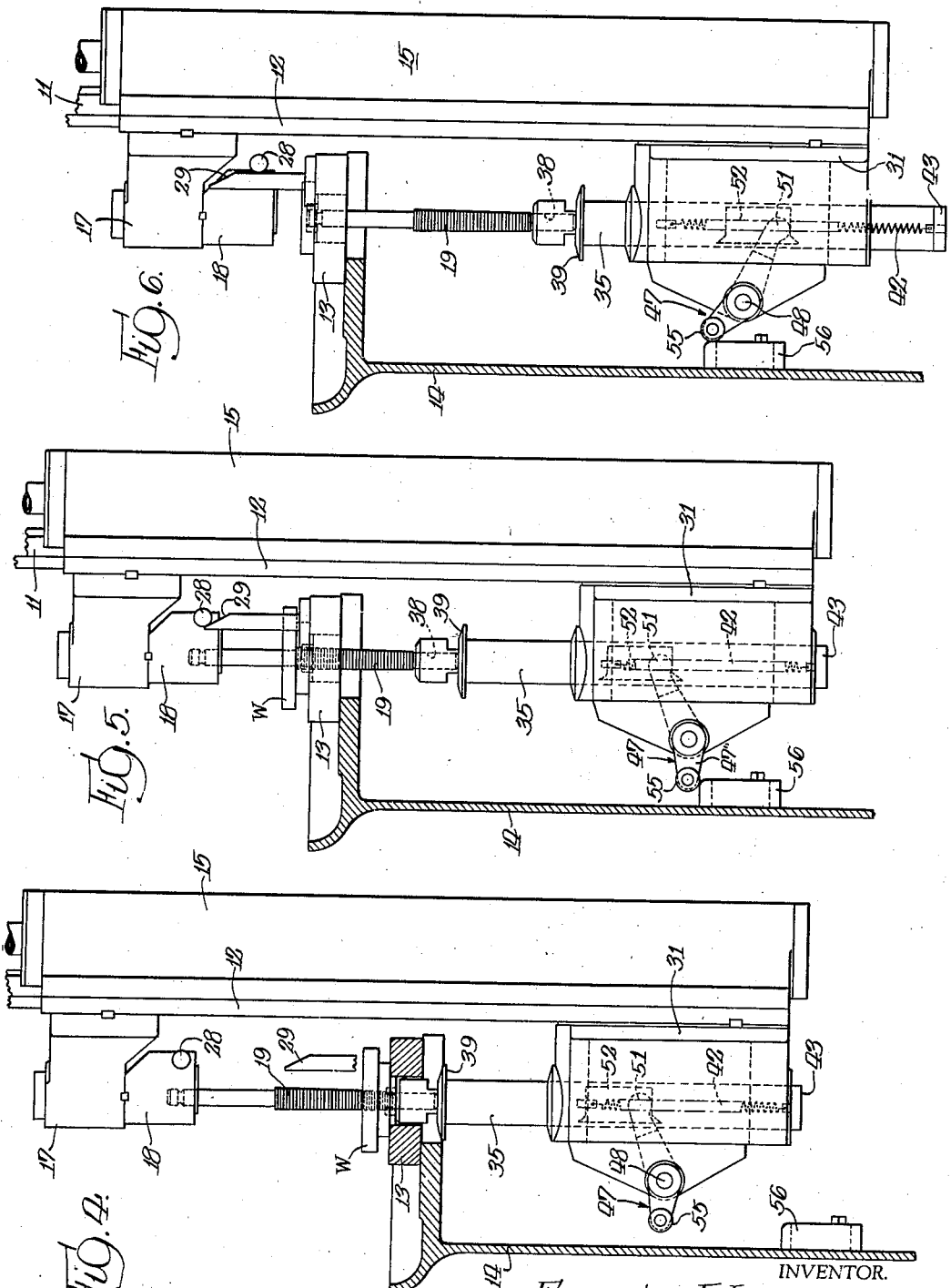

2,263,390

UNITED STATES PATENT OFFICE 2,263,390

BROACH HANDLING MECHANISM

Francis J. Lapointe, Ann Arbor, Mich., assignor, by mesne assignments, to American Broach & Machine Co., Ann Arbor, Mich., a corporation of Michigan Application February 12, 1940, Serial No. 318,497

18 Claims. (Cl. 90—33)

The invention relates generally to a broach handling mechanism and more particularly to a broach handling mechanism for a push broaching machine.

A general object of the invention is to provide in a broaching machine a broach handling mechanism of new and improved construction.

A more particular object of the invention is to provide new and improved and simplified means for withdrawing the broaching tool from the work piece upon completion of the broaching operation and for restoring the tool to the broach head after removal of the work piece.

Another object is to provide broach handling mechanism including a reciprocable broach receiving element in which reciprocation of the broach receiving element for purposes of withdrawing and reinserting a broach from and into a broach head is effected as an incident to movement of the broach actuating carriage.

Yet another object is to provide in a push broaching machine having a carriage extending above and below the work support with a broach receiving head at one end of the carriage, a broach retrieving element mounted on the carriage, at the end opposite the head, in position to receive the free end of the broach after projection through the work support and for movement with and relative to the carriage, and means operable at the end of the broaching stroke and the beginning of the return stroke as an incident to movement of said carriage to move the retrieving element relative to the carriage, respectively to withdraw and to return the broach from and to the head.

Other objects and advantages will become apparent from the following detailed description taken in connection with the accompanying drawings, in which:

Fig. 1 is a side elevational view of a broaching machine embodying the features of the invention with the machine frame broken away in part to reveal certain interior construction.

Fig. 2 is a fragmentary and enlarged front elevational view of the broach retrieving mechanism shown in Fig. 1.

Fig. 3 is an enlarged horizontal sectional view taken approximately along the line 3—3 of Fig. 1.

Fig. 4 is a diagrammatic view of the broach handling mechanism, with the parts shown in the position taken between the first and second phases of the broaching stroke of the broaching machine.

Fig. 5 is a diagrammatic view similar to Fig. 4, but showing the parts of the broach handling mechanism in the positions which they assume between the second and third phases of the broaching stroke of the broaching machine.

Fig. 6 is a diagrammatic view similar to Fig. 4, but showing the parts of the broach handling mechanism in the positions assumed at the end of the broaching stroke of the broaching machine.

While the invention is susceptible of various modifications and alternative constructions, it is shown in the drawings and will hereinafter be described in the preferred embodiment. It is not intended, however, that the invention is to be limited thereby to the specific construction shown, but it is intended to cover all modifications and alternative constructions falling within the spirit and scope of the invention as defined in the appended claims.

For purposes of disclosure, the invention is herein disclosed as embodied in a push down broaching machine of the vertical type. Such a machine, as best seen in Fig. 1, comprises generally an upstanding column 10 having formed in its front face vertical and parallel ways 11 for guiding for vertical reciprocation therein of a ram 12. Positioned substantially midway of the column 10 is a work support 13 disposed horizontally and at a height for use by an operator of the broaching machine. The column 10 normally includes a casing 14 which extends forwardly from the column to enlarge the effective base area of the machine and to provide additional support for the work support 13, as well as to conceal the mechanism housed within the machine. The ram 12 is hydraulic and is composed of an elongated cylinder 15, adapted in all positions of the ram to extend both above and below the work support 13, and a piston 16 which herein is made the stationary element, while the cylinder 15 is made the reciprocable element, for reasons which will presently become more apparent. Any well known means, not disclosed, is provided to supply operating fluid to the opposite ends of the cylinder 15 in desired quantities and at the proper intervals, to effect reciprocation of the ram 12 through a broaching and a return stroke.

Mounted at the upper end of the ram 12 is a broaching tool supporting head 17 extending forwardly from the ram to be disposed over the appropriate portion of the work support and having depending therefrom a broaching tool holder 18 in which is supported a broaching tool 19. This holder is of the releasable type and thus is formed with a recess 20 opening through the bottom thereof having a suitable annular bushing 21 with a bore 22 just large enough to receive the base end of the broaching tool 19. This end of the tool 19 is formed in the usual manner with an annular notch or depression 23 with which there is adapted to engage a slidable detent 24 arranged radially of the tool holder 18. The outer end of the detent 24 is pivotally connected to a lever 25 pivoted at 26 in the tool holder 18, while a tension spring 27 yieldably urges the lever 25 in a direction effecting engagement of the detent 24 with a broaching tool received in the bushing 21. The free end of the lever 25 carries a cam follower in the form of a roller 28 which is adapted, as the ram approaches the end of the broaching stroke, to strike a cam 29 to swing the lever 25 in a counter-clockwise direction, as viewed in Fig. 3, to effect withdrawal of the detent 24. The cam 29 is mounted upon and projects upwardly from the work support 13 and is adapted to engage and actuate the lever 25, as the broaching tool nears the end of its broaching stroke.

Unique means is provided herein for automatically handling the broaching tool 19 to disengage the same from the broach holder 18 for the purpose of permitting removal of a finished work piece and for reengaging the broaching tool with the tool holder to prepare the broach for the successive broaching operation. To that end the ram 12 has secured thereto at its lower end a U-shaped guide bracket 31, each of the legs 32 of which has a bore 33 in which is received a bushing 34 to provide a cylindrical guide bearing. Slidably mounted in the bracket 31 is a cylindrical broach receiving plunger 35 formed at its upper end with a bore 36 carrying a bushing 37 in turn having a bore 38 forming a socket in which the free end of the broaching tool 19 is received with a slidable fit. A radially extending collar 39 is mounted on the plunger near the upper end thereof to serve as a chip guard. The plunger 35 is normally urged toward the work support 13 by yieldable means which here takes the form of a pair of tension springs 42 disposed on diametrically opposite sides of the plunger, and at their upper ends anchored in the upper leg of the bracket 31, and at their lower ends secured to a cross bar 43 secured as by means of a bolt 44 to the lower end of the plunger 35. This cross bar also serves to limit the extent of upward movement of the plunger 35 relative to the bracket 31. It will be apparent from the foregoing that the plunger 35 is supported for movement both with and relative to the ram 12.

Means is provided herein which is operative in timed relation with the disengagement of the holder 18 to effect a shift of the plunger 35 relative to the ram 12 and hence relative to the holder 18 to effect withdrawal of the broaching tool from the holder at the end of the broaching stroke to permit removal of a finished work blank W, and also during the initial portion of the return stroke of the ram 12 to again effect reinsertion of the broaching tool in the holder 18. Herein this means comprises simply a lever 47 composed of an arm 47' and an arm 47" each keyed on a shaft 48 journaled in a bearing bracket 49 secured as by screws 50 to the legs 32 of the guide bracket 31 which have been formed with a flat surface for that purpose. The free end of the lever arm 47' is forked to provide fingers 51 which straddle the plunger 35 at a reduced portion 52 thereof, formed by milled cuts 53 on diametrically opposite sides. The free end of the lever arm 47" carries a follower 55 which engages a cam 56 adjustably mounted on the casing 14 of the machine in the path of the follower 55, as the lever 47 moves downwardly in the broaching stroke of the ram 12. The arm 47' of the lever 47 terminating in the fingers 51, is of twice the length of the arm carrying the follower 55, giving to the lever a mechanical advantage of one-half, and thus effecting a movement of the plunger relative to its guide bracket 31 and the ram whenever, as an incident to movement of the ram, the follower 55 is in engagement with the cam 56. Thus, during the final portion of the broaching stroke of the ram the plunger 35 is shifted relative to the ram and in the same direction of movement, while upon initial return movement of the ram the plunger 35 is again shifted relative to the ram and in the same direction of movement.

The operation of the invention, it is believed, will best be understood from the following brief description of the operation of the broaching machine taken in connection with the diagrammatic Figs. 4 to 6 and Fig. 1, showing the various parts of the machine in the positions assumed at various stages in the operation thereof. Let it be assumed, therefore, that the machine and the broach handling mechanism are in the position shown in Fig. 1, which is the normal starting position of the machine. Under those circumstances, the ram 12 will be at the top of its stroke with the broaching tool 19 secured in the holder 18 and disposed with its lower end a sufficient distance above the work support 13 to permit the mounting of a new work blank upon the support. The plunger 35 will be bearing against the bottom of the work support with its socket end projecting partially into the work support. The springs 42 are at this time extended, for the socket end of the plunger 35 engages the work support and arrests the upward movement of the plunger prior to the time that the ram, and hence the guide bracket 31, reaches the limit of its return or upward movement.

When a new work blank W has been placed in proper position upon the work support 13 (Fig. 4), the machine is conditioned for a broaching operation, and actuation by the attendant of the machine of the appropriate control causes fluid to be supplied to effect a broaching stroke, in this instance a downward stroke of the ram 12. The free end of the broaching tool 19 thus enters and passes through the work blank and the support 13. During this initial portion of the broaching stroke, the bracket 31 moves downwardly with the ram and relative to the plunger 35 which, due to the influence of the springs 42, remains bearing against the work support 13 until the broach enters the socket 38, which is the position of the parts shown in Fig. 4. From that point through the major portion of the broaching stroke, that is, at least until the last tooth of the tool 19 has passed through the work blank, the plunger 35 moves wtih the guide bracket 31 as a unit until the roller 55 of the lever 47 strikes the cam 56, that is, the point in the operation of the machine illustrated in Fig. 5. Simultaneously or, preferably, just slightly prior to the engagement of the roller 55 with the cam 56, roller 28 of the tool holder 18 engages cam 29 to withdraw the detent 24 and release the broaching tool 19. With continued movement of the ram through its broaching stroke, the lever 47 will be pivoted in a clockwise direction and, because of the mechanical advantage of the lever, will shift the plunger 35 relative to the bracket 31 in the direction of movement of the ram. As a consequence, the broaching tool 19 is withdrawn from the holder 18 and from the work blank resting on the support 13, so as to permit removal of the work blank from the support. The parts are now in the position shown in Fig. 6, which is the end of the broaching stroke of the machine. In this position, the machine comes to rest as an incident to the actuation by the ram 12 of a suitable control element not shown. By the shift of the plunger 35 relative to the guide bracket 31, the springs 42 have again been tensioned so that there is a tendency to shift the plunger 35 relative to the bracket 31, which tendency is restrained by the lever 47.

After the finished work blank has been removed from the support 13, the attendant again actuates a suitable control element, not shown, which serves to initiate the return or, in this case, upward movement of the ram. With such upward movement, the lever 47 swings in a counter-clockwise direction, as viewed in Fig. 1, and thus again permits the plunger to shift relative to the bracket 31, this time under the influence of the springs 42, but under control of the lever 47. Being under the control of the lever 47, the movement of the plunger 35 is at twice that of the bracket 31 and in the same direction, with the result that the broaching tool 19 is reinserted into the holder 18. The parts are now again in the position shown in Fig. 5, though, of course, there is no work blank on the support 13. With the upper end of the broaching tool now reinserted in the holder 18, the plunger 35 is restrained against further movement relative to the bracket 31 and all the parts return as a unit until the collar socket 38 on the plunger again strikes the lower portion of the work support 13, which is the position of the parts shown in Fig. 4. Thereafter, continued movement of the ram upwardly to the end of its return stroke causes the broaching tool 19 to be withdrawn from the plunger and raised above the work support a sufficient distance to permit the placing of a new work blank upon the work support. Upon completion of such return movement, a suitable control is actuated by the ram and the machine comes to rest with the parts in the positions shown in Fig. 1.

It is believed apparent, from the foregoing, that I have perfected a greatly improved broaching tool retrieving or handling mechanism for push broaches. This mechanism has the advantage that it may be used on either a vertical or a horizontal type broaching machine and has the additional advantages that the handling mechanism is efficient and effective, and yet does not require the running of actuating fluid conduits thereto, nor does it require complicated control mechanism which requires a great deal of servicing and care. Not only has my construction the advantages mentioned, but also has the advantage that it serves as a guide for the broaching tool throughout the major portion of the broaching stroke, particularly during the cutting portion of the broaching stroke.

I claim as my invention:

1. In a push broaching machine having a frame, a work support, a broach actuating carriage reciprocably mounted on the frame and extending on both sides of the work support, and a broach head at one end of the carriage, broach retrieving means disposed on the side of the work support opposite the broach head including an element mounted on the end of the carriage opposite the head for movement both with and relative to the carriage and adapted to receive the free end of a broach after projection thereof through the work support, and means operable during the final portion of the broaching stroke and during the initial portion of the return stroke of the carriage to move said element relative to the carriage and in the same direction of movement respectively to withdraw the broach from the head and to restore the same thereto.

2. In a push broaching machine having a frame, a work support, a broach actuating carriage reciprocably mounted on the frame and extending on both sides of the work support, and a broach head at one end of the carriage, broach retrieving means disposed on the side of the work support opposite the broach head including an element mounted on the end of the carriage opposite the head for movement both with and relative to the carriage and adapted to receive the free end of a broach after projection thereof through the work support, yieldable means constantly urging said element toward the work support, and means operable during the final portion of the broaching stroke of the carriage to move said element relative to the carriage to withdraw the broach from the head and operable during the initial portion of the return stroke to permit movement of said element by said yieldable means relative to the carriage to effect reinsertion of the broach in the head.

3. In a push broaching machine having a work support, a reciprocable broach actuating carriage, and a broach head secured to the carriage and disposed on one side of the work support, broach retrieving means disposed on the side of the work support opposite the broach head including a yieldably mounted element urged toward engagement with the work support and formed at the end adjacent the work support with a socket for the reception of the free end of a broach as the same projects through the work support, said element throughout the major portion of its movement being actuated by the carriage through the broach, and means operable during the final portion of the broaching stroke of the carriage to impart to said element a rate of movement greater than that of the carriage to withdraw the broach from the broach head and operable during the initial portion of the return movement of the carriage to permit movement of said element toward the support at a faster rate than that of the carriage to effect reengagement of the broach with the broach head.

4. In a push broaching machine having a frame, a work support, a carriage reciprocably mounted on the frame and extending to both sides of the work support, and a broach head mounted at one end of the carriage, the combination of a releasable broach holder carried by the head, cam means mounted on the work support operable as the carriage approaches the end of its broaching stroke to engage and cause said holder to release a broach held therein, and retrieving means for the broach disposed on the side of the work support opposite the head comprising a retrieving element adapted to receive the free end of a broach after projection through the work support and mounted on the carriage for movement both therewith and relative thereto, and means operable during the final movement of the broaching stroke of the carriage and during the initial return movement of the carriage to move said retrieving element relative to the carriage and in the same direction of movement respectively to withdraw and return the broach from and to the broach head, the relative movement of said retrieving element during the broaching stroke of the carriage commencing after release of the broach by said holder.

5. In a push broaching machine having a frame, a work support, a carriage reciprocably mounted on the frame and extending to both sides of the work support, and a broach head mounted at one end of the carriage, the combination of a releasable broach holder carried by the head, cam means mounted on the work support operable as the carriage approaches the end of its working stroke to engage and cause said holder to release a broach held therein, and retrieving means for the broach disposed on the side of the work support opposite the head comprising a retrieving element adapted to receive the free end of a broach after projection through the work support and mounted on the carriage for movement both therewith and relative thereto, and means operable as an incident to movement of the carriage during the final movement of the broaching stroke and during the initial return movement to move said retrieving element relative to the carriage and in the same direction of movement respectively to withdraw and return the broach from and to the broach head.

6. In a push broaching machine, a frame, a work support intermediate the ends of the frame, a broach actuating carriage reciprocably mounted on said frame and extending on both sides of the work support, a broach head at one end of the carriage including a releasable holder for disengageably securing a broach, a cam member projecting upwardly from the work support, said cam member engaging and releasing the holder of said broach head during the final portion of the broaching stroke, and broach retrieving means disposed on the side of said work support opposite said broach head comprising an element mounted on the lower end of said carriage for movement therewith and relative thereto and having a broach receiving socket formed in the end thereof adjacent the work support, yieldable means urging said element toward said work support, said element in the normal starting position of the broaching machine engaging said work support and remaining in engagement with said work support until the free end of the broach projects through said work support and into the socket of said element and thereafter moving with said carriage, and means operable during the final broaching stroke of said carriage to shift said element at a higher rate than said carriage to withdraw the broach from said holder and operable to permit return movement of said element at a rate greater than said carriage during the initial return movement of said carriage to effect reengagement of the broach with the broach head.

7. In a push broaching machine, a frame, a work support intermediate the ends of the frame, a broach actuating carriage reciprocably mounted on said frame and extending on both sides of the work support, a broach head at one end of the carriage including a releasable holder for disengageably securing a broach, a cam member projecting upwardly from the work support, said cam member engaging and releasing the holder of said broach head during the final portion of the broaching stroke, and broach retrieving means disposed on the side of said work support opposite said broach head comprising a guide fixed on said carriage at the end opposite said head, an element reciprocably mounted in said guide for moving with or relative to said carriage and having a broach receiving socket at one end, yieldable means connected between said element and guide urging said element toward said work support, and a lever pivotally mounted on said guide and having one end in engagement with said element, and a cam mounted on said frame in the path of the other end of said lever to rotate said lever during the final movement of the broaching stroke of the carriage and shift said element relative to the carriage to effect withdrawal of the broach from said head, said lever during the initial return movement of said carriage permitting shift of said element relative to said carriage by said yieldable means to reengage the broach with said head.

8. In a broaching machine, a frame, a work support disposed intermediate the ends of the frame, a broach actuating carriage reciprocably mounted on the frame for movement through a broaching and return stroke and extending on both sides of said work support, a broach head at one end of said carriage, and broach retrieving means disposed on the side of said support opposite said broach head comprising an element adapted to receive one end of a broach and mounted on the end of said carriage opposite said broach head for movement with or longitudinally relative to said carriage, and means operable as an incident to movement of said carriage during a portion of the stroke thereof to shift said element longitudinally relative to said carriage.

9. In a broaching machine, a frame, a work support disposed intermediate the ends of the frame, a broach actuating carriage reciprocably mounted on the frame for movement through a broaching and return stroke and extending on both sides of said work support, a broach head at one end of said carriage, and broach retrieving means disposed on the side of said support opposite said broach head comprising an element adapted to receive one end of a broach and mounted on the end of said carriage opposite said broach head for movement with or longitudinally relative to said carriage, and means operable as an incident to movement of said carriage during the initial portion of its stroke in one direction and during the final portion of its stroke in the opposite direction to control shift of said element longitudinally relative to said carriage to effect engagement and disengagement of a broach with said broach head.

10. In a broaching machine, a frame, a work support disposed intermediate the ends of the frame, a broach actuating carriage reciprocably mounted on the frame for movement through a broaching and return stroke and extending on both sides of said work support, a broach head at one end of said carriage, and broach retrieving means disposed on the side of said support opposite said broach head comprising an element adapted to receive one end of a broach and mounted on the end of said carriage opposite said broach head for movement with or longitudinally relative to said carriage, means urging said element toward said broach head, and means exercising control over said element operable as an incident to movement of said carriage during the final portion of its stroke in one direction to shift said element longitudinally relative to said carriage in a manner to withdraw a broach from the broach head and during the initial portion of said carriage stroke in the opposite direction permitting shift of said element relative to said carriage by said yieldable means to effect insertion of a broach in said broach head.

11. In a broaching machine, a frame, a work support disposed intermediate the ends of the frame, a broach actuating carriage reciprocably mounted on the frame for movement through a broaching and a return stroke and extending on both sides of said work support, a broach head at one end of said carriage including a releasable broach holder, and broach retrieving means disposed on the side of said support opposite said broach head comprising an element adapted to receive one end of a broach and mounted on the end of said carriage opposite said broach head for movement with or relative to said carriage, means yieldably urging said element toward said broach head, said element during the final portion of the movement of said carriage in one direction engaging and being restrained against further movement by said work support while said carriage continues its movement to separate a broach carried by said broach head from said element, and means exercising control over said element when said carriage is at the other end of its stroke operable as an incident to movement of said carriage during the final portion of its movement to the last mentioned position to shift said element relative to said carriage to withdraw the broach from the broach head and effective during the initial portion of said carriage stroke away from the last mentioned position permitting shift of said element relative to said carriage by said yieldable means to effect insertion of the broach in said broach head.

12. In a broaching machine, a frame, a work support disposed intermediate the ends of the frame, a broach actuating carriage reciprocably mounted on the frame for movement through a broaching and a return stroke and extending on both sides of said work support, a broach head at one end of said carriage including a releasable broach holder, and broach retrieving means disposed on the side of said support opposite said broach head comprising a guide bracket fixed on the end of said carriage opposite said broach head to move with said carriage, an element adapted to receive the free end of a broach carried by said broach head mounted in said guide bracket for movement with or relative to said carriage, spring means connected between said bracket and said element urging said element toward said broach head, said element during the final portion of the movement of said carriage in one direction engaging and being held against further movement by said work support while said carriage continues its movement to effect separation of a broach carried by said broach head from said element, a lever pivotally mounted on said guide bracket having engagement at one end with said element and projecting at the opposite end, a cam fixed on the frame disposed in the path of the projecting end of said lever and operable during the final portion of the movement of said carriage in a direction opposite to the first mentioned direction to rock said lever to shift said element relative to said carriage and effect withdrawal of the broach from the broach head and permitting movement of said element relative to said carriage by said yieldable means during the initial movement of said carriage in the first mentioned direction to effect reinsertion of the broach in said broach head.

13. In a broaching machine having a broach actuating carriage, broach retrieving means comprising a U-shaped guide bracket fixed on the carriage for movement therewith, a plunger reciprocably mounted in said guide bracket having at one end a socket for the reception of a broach and an annular flange for limiting the movement of said plunger, a bearing bracket secured to the legs of said U-shaped guide bracket, a lever pivotally mounted in said bearing bracket and having a forked end adapted to engage said plunger and a projecting end carrying a cam follower, the portion of said lever terminating in the forked end having a length greater than that of the portion terminating in the cam follower, and springs connected between said plunger and said guide bracket to urge said plunger in one direction.

14. In a broaching machine having a broach actuating carriage, broach retrieving means comprising a guide bracket fixed on the carriage for movement therewith, a plunger reciprocably mounted in said guide bracket having at one end means for the engagement of a broach, a bearing bracket secured to said guide bracket, a lever pivotally mounted in said bearing bracket and having an arm terminating in a forked end adapted to engage said plunger and an arm carrying a cam follower, the first mentioned arm of said lever having a length twice that of the last mentioned arm, and tension springs connected between said plunger and said guide bracket urging said plunger in one direction.

15. In a broaching machine, a frame, a work support disposed intermediate the ends of the frame, a broach actuating carriage reciprocably mounted on the frame for movement through a broaching and return stroke and extending on both sides of said work support, a broach head at one end of said carriage, and broach retrieving means disposed on the side of said support opposite said broach head comprising an element adapted to receive one end of a broach and mounted on the end of said carriage opposite said broach head for movement with or relative to said carriage, a stationary member on said frame, and means engaging said stationary member during portions of the reciprocation of said carriage and actuated thereby to shift said element relative to said carriage.

16. In a broaching machine, a frame, a work support disposed intermediate the ends of the frame, a broach actuating carriage reciprocably mounted on the frame for movement through a broaching and return stroke and extending on both sides of said work support, a broach head at one end of said carriage, and broach retrieving means disposed on the side of said support opposite said broach head comprising an element adapted to receive one end of a broach and mounted on the end of said carriage opposite said broach head for movement with or relative to said carriage, and cooperating means operable as an incident to movement of said carriage during a portion of the stroke thereof to shift said element relative to said carriage comprising an element mounted on said carriage, and a stationary member mounted on said frame in the path of said element on said carriage to actuate the same during portions of the movement of said carriage.

17. In a push broaching machine having a frame, a work support, a broach actuating carriage reciprocably mounted on the frame and including a broach head, broach retrieving means disposed on the side of the work support opposite the broach head including an element mounted for movement both with the carriage and relative to the carriage in the direction of reciprocation thereof and adapted to receive the free end of a broach after projection thereof through the work support, and means operable during the final portion of the broaching stroke and during the initial portion of the return stroke of the carriage to move said element relative to the carriage and in the same direction of movement respectively to withdraw the broach from the head and to restore the same thereto.

18. In a push broaching machine having a frame, a work support, a broach actuating carriage reciprocably mounted on the frame and including a broach head, broach retrieving means disposed on the side of the work support opposite the broach head including an element mounted for movement both with the carriage and relative to the carriage in the direction of reciprocation thereof and adapted to receive the free end of a broach after projection thereof through the work support, and means operable during the final portion of the broaching stroke and during the initial portion of the return stroke of the carriage and as an incident to movement of the carriage to move said element relative to the carriage and in the same direction of movement respectively to withdraw the broach from the head and to restore the same thereto.

FRANCIS J. LAPOINTE.